US008516173B2

(12) United States Patent
Betz et al.

(10) Patent No.: US 8,516,173 B2
(45) Date of Patent: Aug. 20, 2013

(54) SWAPPING PPRC SECONDARIES FROM A SUBCHANNEL SET OTHER THAN ZERO TO SUBCHANNEL SET ZERO USING CONTROL BLOCK FIELD MANIPULATION

(75) Inventors: John F. Betz, Red Hook, NY (US); Harry M. Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 117 days.

(21) Appl. No.: 12/180,651

(22) Filed: Jul. 28, 2008

(65) Prior Publication Data

US 2010/0023647 A1 Jan. 28, 2010

(51) Int. Cl.
*G06F 13/00* (2006.01)

(52) U.S. Cl.
USPC .............................. 710/74; 710/100; 714/13

(58) Field of Classification Search
USPC ................... 711/162; 710/5, 100; 714/6, 43, 714/13
See application file for complete search history.

(56) References Cited

U.S. PATENT DOCUMENTS

| 4,489,379 | A | 12/1984 | Lanier et al. |
| 5,504,861 | A | 4/1996 | Crockett et al. |
| 6,240,467 | B1 | 5/2001 | Beardsley et al. |
| 6,304,980 | B1 * | 10/2001 | Beardsley et al. ........... 714/6.23 |
| 6,499,112 | B1 | 12/2002 | Milillo et al. |
| 6,973,586 | B2 | 12/2005 | Petersen et al. |
| 7,039,120 | B1 * | 5/2006 | Thoumy et al. ............... 375/275 |
| 7,043,665 | B2 | 5/2006 | Kern et al. |
| 7,058,731 | B2 * | 6/2006 | Kodama ........................... 710/5 |
| 7,065,623 | B2 | 6/2006 | Chen et al. |
| 7,085,956 | B2 | 8/2006 | Petersen et al. |
| 7,366,853 | B2 * | 4/2008 | Honda et al. ................... 711/156 |
| 7,603,581 | B2 * | 10/2009 | Boyd et al. .................... 714/6.23 |
| 2003/0002492 | A1 | 1/2003 | Gallagher et al. |
| 2003/0056142 | A1 | 3/2003 | Hashemi |
| 2003/0204772 | A1 | 10/2003 | Petersen et al. |
| 2003/0204773 | A1 | 10/2003 | Petersen et al. |

(Continued)

FOREIGN PATENT DOCUMENTS

WO 02096035 A1 11/2002

OTHER PUBLICATIONS

IBM, "Bad Response to Establish Pathing Control Frame in Peer-toPeer Remote Copy Function," Technical Disclosure, IP.com, Dec. 1, 1995, http://www.ip.com/pubview/IPCOM000117123D.

(Continued)

*Primary Examiner* — Ernest Unelus
(74) *Attorney, Agent, or Firm* — Cantor Colburn LLP; William A. Kinnaman, Jr.

(57) ABSTRACT

A method for swapping peer-to-peer remote copy (PPRC) secondary device definitions from a subchannel set other than zero to subchannel set zero by the utilization of control blockfield manipulation includes identifying a PPRC primary and secondary device pair, wherein a PPRC primary device definition resides at subchannel set zero and the PPRC secondary device definition resides at a subchannel set other than subchannel set zero; within operating system definitions of the PPRC pair, exchanging physical information associated with the PPRC primary and secondary devices, including pathing, node descriptor, device number, and a field cross referencing device numbers of the PPRC pair; and within channel subsystem definitions of the PPRC primary and secondary devices, via a SwapSubchannel instruction, exchanging physical information, including path and control unit information while retaining a subchannel identifier, a subchannel set identifier, and a subchannel interruption parameter pointing to the operating system definition of the device.

12 Claims, 5 Drawing Sheets

(56) References Cited

U.S. PATENT DOCUMENTS

| | | | |
|---|---|---|---|
| 2004/0090912 A1 | 5/2004 | Loo | |
| 2004/0246931 A1* | 12/2004 | Thubert et al. | 370/338 |
| 2004/0260899 A1 | 12/2004 | Kern et al. | |
| 2005/0005063 A1* | 1/2005 | Liu et al. | 711/112 |
| 2005/0081091 A1 | 4/2005 | Bartfai et al. | |
| 2005/0114358 A1 | 5/2005 | Chen et al. | |
| 2005/0114566 A1* | 5/2005 | Chen et al. | 710/38 |
| 2005/0114740 A1 | 5/2005 | Carberry et al. | |
| 2005/0144521 A1 | 6/2005 | Werner | |
| 2005/0154846 A1* | 7/2005 | Chen et al. | 711/162 |
| 2005/0268054 A1 | 12/2005 | Werner et al. | |
| 2006/0075154 A1* | 4/2006 | Carlson et al. | 710/15 |
| 2006/0167100 A1 | 7/2006 | Wuthrich et al. | |
| 2006/0179170 A1 | 8/2006 | Kodama | |
| 2007/0050538 A1* | 3/2007 | Northcutt et al. | 711/112 |
| 2007/0157002 A1* | 7/2007 | Zelikov et al. | 711/202 |
| 2008/0005146 A1* | 1/2008 | Kubo et al. | 707/102 |
| 2008/0104443 A1* | 5/2008 | Akutsu et al. | 714/6 |
| 2009/0094403 A1* | 4/2009 | Nakagawa et al. | 711/6 |
| 2009/0259818 A1* | 10/2009 | Mogi et al. | 711/162 |
| 2009/0265584 A1* | 10/2009 | Kawakami et al. | 714/43 |

OTHER PUBLICATIONS

IBM, "Compatibility Mode for the Establishment of Peer to Peer Remote Copy Paths," Technical Disclosure, IP.com, Jan. 26, 2005, http://www.ip..com/pubview/IPCOM000035614D.

Bill Ogden, "IBM System z9 109 Technical Introduction," Jul. 26, 2005, p. 1-6.

IBM, "Management of Peer-to-Peer Control Unit Paths," Technical Disclosure, IP.com, Sep. 1, 1995, http://www.ip.com/pubview/IPCOM000116373D.

IBM, "Single Subsystem PPRC Copy," Technical Disclosure, IP.com, Feb. 1, 1999, http://www.ip.com/pubview/IPCOM000123629D.

Sun Microsystems, "StorageTek Shared Wirtual Array (SVA)," 2006, pp. 48-49.

Bill et al, IBM System z9 109 Technical introduction, Jult 2005, IBM Redbooks, pp. ix, vi, 30-33.

Joshua et al., Java Puzzlers: traps, pitfalls, and corner cases, Jun. 2005, Addison-Wesley Professional, pp. vii, 11.

* cited by examiner

SWAPPING PPRC SECONDARIES FROM A SUBCHANNEL SET OTHER THAN ZERO TO SUBCHANNEL SET ZERO USING CONTROL BLOCK FIELD MANIPULATION

BACKGROUND

This invention relates generally to channel input/output (I/O) operations and, more particularly, to the defining of peer-to-peer remote copy devices within subchannels sets other than subchannel set zero.

Channel I/O broadly refers to any high performance I/O architecture that is employed within a computing architecture environment. Generally, channel I/O is implemented by the use of a plurality of dedicated I/O controllers (or processors) working in conjunction with a central processing unit (CPU) in order to ensure the efficient swapping of data within a computing system environment. As such, the I/O controller is supplied with enough onboard logic and memory to autonomously handle a CPU's I/O task processing request.

In operation, the CPU will deliver channel programs to an I/O controller, the channel programs providing the I/O controller with the capability to complete any desired I/O task that is necessitated within the system without the burdening the CPU with the performance of the I/O processing task. Upon the completion of the I/O task, or in the event of an error, the I/O controller will communicate the status of the task to the CPU by way of an interrupt operation.

From a configuration standpoint, a channel is an independent hardware component that is implemented to coordinate I/O to a predefined set of devices or controllers. Since a channel may support one or more devices or controllers, the channel programs that are associated with a channel will comprise the commands that the channel is responsive to in addition to the commands for the various devices and controllers to which the channel may be associated. Thus, an operating system has only to assemble the I/O commands for a respective program, deliver the program to the I/O controller, and thereafter execute a single I/O machine instruction to initiate the channel program; wherein thereafter the channel will take responsibility of the I/O task until the completion of the task.

Often implemented in conjunction with channel I/O operations, peer-to-peer remote copy (PPRC) describes a protocol that is implemented in order to mirror a primary storage volume to a control unit that is associated with a secondary storage volume. As such, the utilization of synchronous PPRC causes each write operation to the primary storage to be performed at the secondary storage volume as well.

SUMMARY

In an exemplary embodiment, a method for swapping peer-to-peer remote copy (PPRC) secondary device definitions from a subchannel set other than zero to subchannel set zero by the utilization of control block-field manipulation includes identifying a PPRC primary and secondary device pair, wherein a PPRC primary device definition resides at subchannel set zero and the PPRC secondary device definition resides at a subchannel set other than subchannel set zero; within operating system definitions of the PPRC pair, exchanging a first type of physical information associated with the PPRC primary and secondary devices, including one or more of: pathing, node descriptor, device number, and a field cross referencing device numbers of the PPRC pair; and within channel subsystem definitions of the PPRC primary and secondary devices, via a SwapSubchannel instruction, exchanging a second type of physical information, including one or more of: path and control unit information while retaining a subchannel identifier, a subchannel set identifier, and a subchannel interruption parameter containing the address of the operating system definition of the device.

In another embodiment, a computer program product includes a computer-readable medium having computer-executable program code stored thereon that, when executed, causes a computer to implement a method for swapping peer-to-peer remote copy (PPRC) secondary device definitions from a subchannel set other than zero to subchannel set zero by the utilization of control block-field manipulation. The method includes identifying a PPRC primary and secondary device pair, wherein a PPRC primary device definition resides at subchannel set zero and the PPRC secondary device definition resides at a subchannel set other than subchannel set zero; within operating system definitions of the PPRC pair, exchanging a first type of physical information associated with the PPRC primary and secondary devices, including one or more of: pathing, node descriptor, device number, and a field cross referencing device numbers of the PPRC pair; and within channel subsystem definitions of the PPRC primary and secondary devices, via a SwapSubchannel instruction, exchanging a second type of physical information, including one or more of: path and control unit information while retaining a subchannel identifier, a subchannel set identifier, and a subchannel interruption parameter containing the address of the operating system definition of the device.

In still another embodiment, a system for swapping peer-to-peer remote copy (PPRC) secondary device definitions from a subchannel set other than zero to subchannel set zero by the utilization of control block-field manipulation includes a computing network including a processing device in communication with one or more computer memory storage devices. The computing network is further configured to implement a method, including identifying a PPRC primary and secondary device pair, wherein a PPRC primary device definition resides at subchannel set zero and the PPRC secondary device definition resides at a subchannel set other than subchannel set zero; within operating system definitions of the PPRC pair, exchanging a first type of physical information associated with the PPRC primary and secondary devices, including one or more of: pathing, node descriptor, device number, and a field cross referencing device numbers of the PPRC pair; and within channel subsystem definitions of the PPRC primary and secondary devices, via a SwapSubchannel instruction, exchanging a second type of physical information, including one or more of: path and control unit information while retaining a subchannel identifier, a subchannel set identifier, and a subchannel interruption parameter containing the address of the operating system definition of the device.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 1:
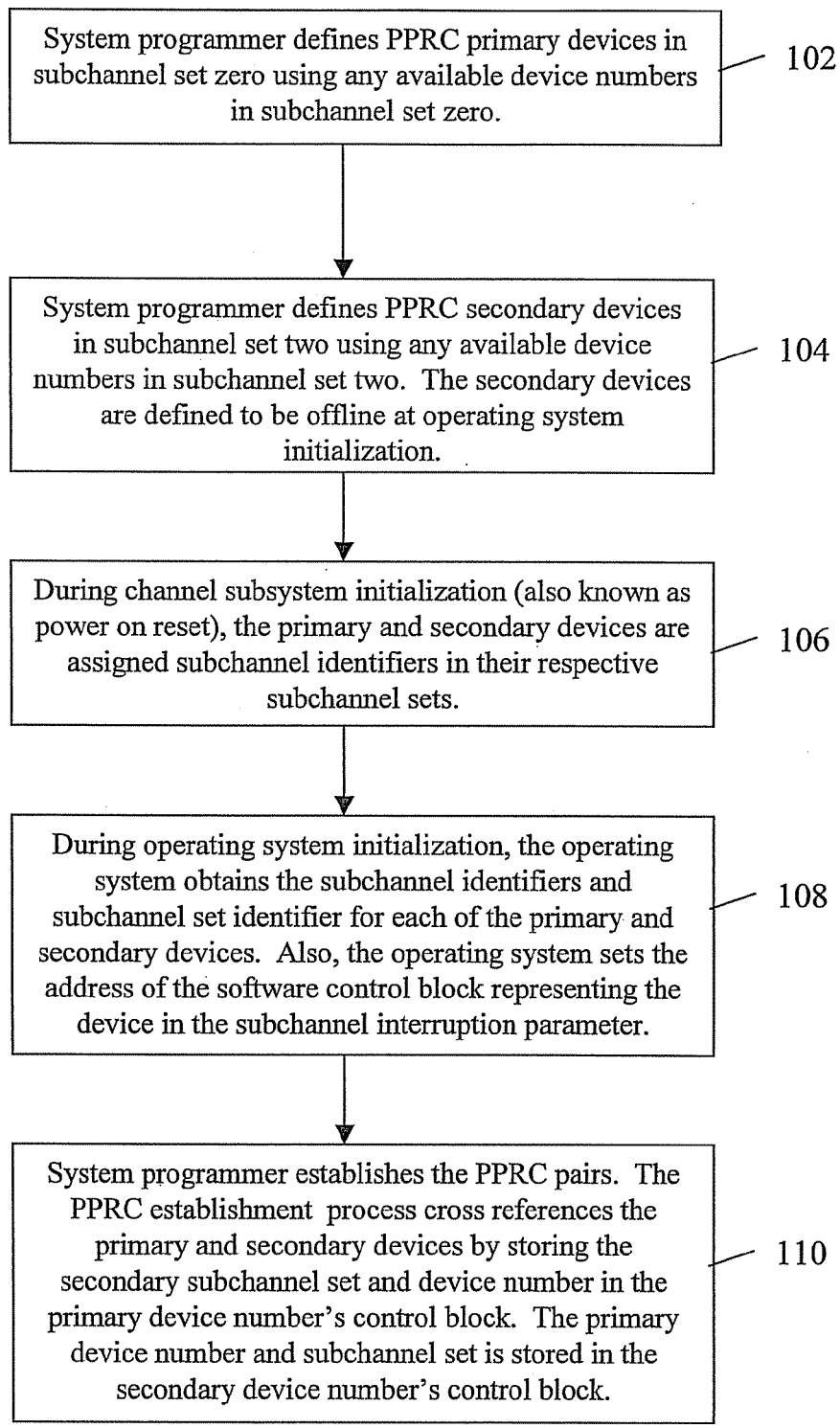
FIG. 1 is a flow diagram illustrating a method for swapping peer-to-peer remote copy (PPRC) secondary device definitions from a subchannel set other than zero to subchannel set zero by the utilization of control block-field manipulation, in accordance with an embodiment of the invention.

One or more exemplary embodiments of the invention are described below in detail. The disclosed embodiments are intended to be illustrative only since numerous modifications and variations therein will be apparent to those of ordinary skill in the art.

Within the IBM server zSeries® system architectures and in the z/OS operating system there is a base device number constraint in the subchannel set zero. The architecture of the zSeries® provides for a maximum of 65,280 subchannels within the subchannel set zero and the z/OS operating system is provided with a maximum of 65,536 device addresses. Exemplary embodiments of the present invention relate to a methodology for relieving the device number constraints within any operating system by exploiting predefined subchannel sets other than zero by defining PPRC devices within subchannel sets other than zero. As such, exemplary embodiments of the present invention provide device number constraint relief by moving PPRC secondary device definitions that are currently only allowed to be defined within subchannel set zero, to any subchannel set other than zero. Thus, for all paired devices n, this will provide additional n/2 additional device numbers and subchannels within subchannel set zero.

Currently, the management of device numbers and subchannels featured within the various subchannel sets is restricted to an I/O supervisor component of an operating system (OS). This restriction is not the result of a hardware or microcode restriction but rather a restriction that is implemented within the OS itself. The reason for the implementation of such a restriction is to avoid the myriad code changes that would be required for the manipulation of the many I/O control blocks that are required to be accessed during the course of any application required I/O as well as providing the capability to differentiate between duplicate device numbers that may exist in differing subchannel sets.

Presently, only the aliases of base parallel access volumes (PAVs) are accessible from a subchannel set other than subchannel set zero (this being subchannel set one). The aliases that reside within subchannel set one can operate without changing any I/O related application control blocks since the aliases are performing on behalf of a base device that still resides within subchannel set zero; thus, there is no need to change any associated application control blocks in order to complete an I/O task.

While the assignment of aliases to subchannel set one provides significant relief for systems that need to implement additional base devices, additional relief is still needed due to the continued growth in the number of base device numbers that are being employed to support a need for additional data within computing system environments. In many instances, PPRC is implemented to backup important system data in case of catastrophic failure. However, PPRC utilizes a device number for each primary device and secondary device that is comprised within a PPRC device pairing.

In operation, PPRC secondary devices are offline to the OS. Further, no application I/O is allowed to access a PPRC secondary device. Within PPRC, the secondary device is kept in sync with the primary device via I/O that is managed exclusively by an I/O control unit. However, the OS manages the settings of the I/O control unit in order to establish, interrogate, and disband PPRC device pairs.

As mentioned above, only the aliases of a PPRC primary device are accessible by application I/O from a subchannel set other than subchannel set zero (this subchannel set presently being subchannel set one). Further, the present methodology of having a PPRC primary device definition and PPRC secondary device definition reside within the same subchannel set (subchannel set zero) places undue constraints on the number of base devices that may be implemented within a computing system environment. As such, exemplary embodiments of the present invention provide a solution for all paired PPRC devices by moving the secondary PPRC device definitions from subchannel set zero to another subchannel set other than zero (e.g., subchannel sets two, three, four, etc.); wherein for all paired devices n, an additional n/2 device numbers and subchannels within subchannel set zero is provided.

However, since only the OS I/O supervisor component can access any secondary PPRC devices, in the event of a failure at the control unit of the PPRC primary device, exemplary embodiments of the present invention also provide a solution that will enable application I/O to be accessible to the PPRC secondary devices and device definitions that reside in subchannels sets other than zero.

Disclosed herein is a method for swapping peer-to-peer remote copy (PPRC) secondary device definitions from a subchannel set other than zero to subchannel set zero by the utilization of control block-field manipulation. An exemplary method embodiment comprises identifying a PPRC primary and secondary device pair, wherein the PPRC primary device definitions reside at subchannel set zero and the PPRC secondary device definitions reside at a subchannel set other than subchannel set zero. A further exemplary embodiment of the present invention provides a further solution for the occurrence of control unit maintenance or a control unit failure in which the PPRC secondary device is required to assume the operations of the PPRC primary device in such a way that application I/O can proceed without interruption. This exemplary embodiment provides for the swapping of a PPRC secondary device definition residing in a subchannel set other than zero (e.g., subchannel set one, two, three, etc.) with the primary subchannel residing in subchannel set zero in order to allow application I/O to access the PPRC secondary device definitions in the event of a control unit failure occurrence in which the PPRC secondary device needs to become the PPRC primary device so that application I/O can proceed without interruption. In this instance, a new swap subchannel instruction is implemented to swap the secondary device definitions from subchannel set other than zero with the primary device definitions in subchannel set zero. This has, at least, the following advantages:

First, the method is faster and more efficient than using dynamic I/O reconfiguration. Second, this method negates the need to maintain a swap indication flag in the software and forcing the I/O supervisor to reroute the I/O request to a subchannel set other than zero. This method allows the I/O supervisor to continue to initiate application I/O to only devices in subchannel set zero instead of devices defined in alternate subchannel sets.

Further, this method frees the system programmer from maintaining duplicate device numbers in different subchannel sets and allows the definitions to be any available device numbers in any of the subchannel sets.

An exemplary embodiment of the present invention comprises defining PPRC secondary device definitions to a subchannel set other than subchannel set zero. This aspect is useful in providing space within subchannel set zero wherein additional devices numbers may be associated with subchannel set zero.

Within exemplary embodiments, the designation of the PPRC secondary device as residing within a subchannel set differing from subchannel set zero would not require that the PPRC secondary be defined as a special device or a special device number, thus freeing the system programmer to choose any device numbers that are available.

Within exemplary embodiments of the present invention, a new instruction, SwapSubchannel, would perform swapping of the physical information within and between the subchannel definitions of the primary and secondary PPRC devices without the need of the channel subsystem to understand the PPRC relationship.

Within exemplary embodiments of the present invention in order to establish PPRC device pairings, perform device interrogates, break apart PPRC device pairs, or re-synchronize PPRC device pairs, etc., OS functions that perform these tasks using device numbers will be required to expand their device number representations to include both the device number of the PPRC device and the subchannel set in which the PPRC device resides. PPRC functions can implement conventional UCB lookup services (e.g., such as UCBLOOK and UCBSCAN) in order to utilize the new device number and subchannel set indications. Further, the I/O requests issued to the PPRC devices and control units to perform various tasks would use the UCB addresses found using specific subchannel sets.

Application I/O requests for the PPRC primary device will continue without change to utilize the address of device definition even after the swap has occurred to allow I/O requests to be sent to the secondary device when the primary device is no longer available to the application. Applications obtain the device address information (UCB address) using services that are currently provided to the application (i.e., lookup services such as UCBLOOK and UCBSCAN). Since the applications have made no changes, these services can rapidly obtain the addressing information for the PPRC primary device.

The present exemplary embodiment further provides a solution for the occurrence of a control unit failure in which the PPRC secondary device is required to assume the operations of the PPRC primary devices in such a way that application I/O can proceed without interruption. In this instance a PPRC device definition is implemented either via command or programmatically to stop using the failing PPRC primary device and begin using the PPRC secondary device. When this occurs, in order to prevent application I/O from having any awareness of the change in PPRC devices, the physical information is swapped between the device definitions and subchannel definitions of the PPRC primary and secondary devices.

Once the failing control unit is recovered, a system user may choose to re-establish the original PPRC pairing using the repaired device as the primary device of the PPRC pair. The user will invoke the PPRC management component which then issues lookup services in order to obtain the current device addresses of the PPRC devices and based on the linkage fields in the device definitions, will obtain the correct device address for the current active device as well as the repaired device. As a result, subsequent OS I/O requests will be directed to the correct physical device and not be dependent on maintaining an awareness of the current subchannel set within its control block structures.

Once the PPRC device pairs are re-established, the user may initiate the swap process again in order to reverse the PPRC primary device back to the repaired device, thus swapping the physical characteristics of the PPRC primary devices and PPRC secondary devices.

In the instance of a failover event occurring from a PPRC primary device to a PPRC secondary device, a swapping process occurs to allow the current device control block definition of the primary device to be exchanged with the definition of the secondary device definition. Application I/O is dependent on the address of the device control block (UCB address) of the device to which it is communicating. The purpose of the swap process is to allow application I/O to continue to use the same address of the software representation of the device yet talk to a different device that is not in a failing state that contains the same data as the original primary device. The swap process shields the application from any knowledge of the failover and subsequent recovery.

With specific reference to the figures now, FIG. 1 is a flow diagram illustrating a method 100 for swapping peer-to-peer remote copy (PPRC) secondary device definitions from a subchannel set other than zero to subchannel set zero by the utilization of control block-field manipulation, in accordance with an embodiment of the invention. As shown in block 102, a system programmer defines PPRC primary devices in subchannel set zero using any available device numbers in subchannel set zero. In block 104, the system programmer further defines PPRC secondary devices in subchannel set two using any available device numbers in subchannel set two (for example). The secondary devices are defined to be offline at operating system initialization. As further shown in block 106, during channel subsystem initialization (also known as power on reset), the primary and secondary devices are assigned subchannel identifiers in their respective subchannel sets. During operating system initialization (block 108), the operating system obtains the subchannel identifiers and subchannel set identifier for each of the primary and secondary devices. In addition, the operating system sets the address of the software control block in the subchannel interruption parameter. Although the subchannel definition and initialization and the software definition and initialization of the PPRC primary devices are defined in subchannel set zero and the PPRC secondary devices in subchannel set 2, they could be defined to any subchannel set that is supported by the z/Architecture. Then, in block 110, the system programmer establishes the PPRC pairs. The PPRC establishment process cross-references the primary and secondary devices by storing the secondary subchannel set and device number in the primary device number's control block. The primary device number and subchannel set is stored in the secondary device number's control block. During this process, the software definitions link the PPRC pairs together in the software device definitions while the subchannel definitions maintain independence from the knowledge of this definition.

Figure 2:
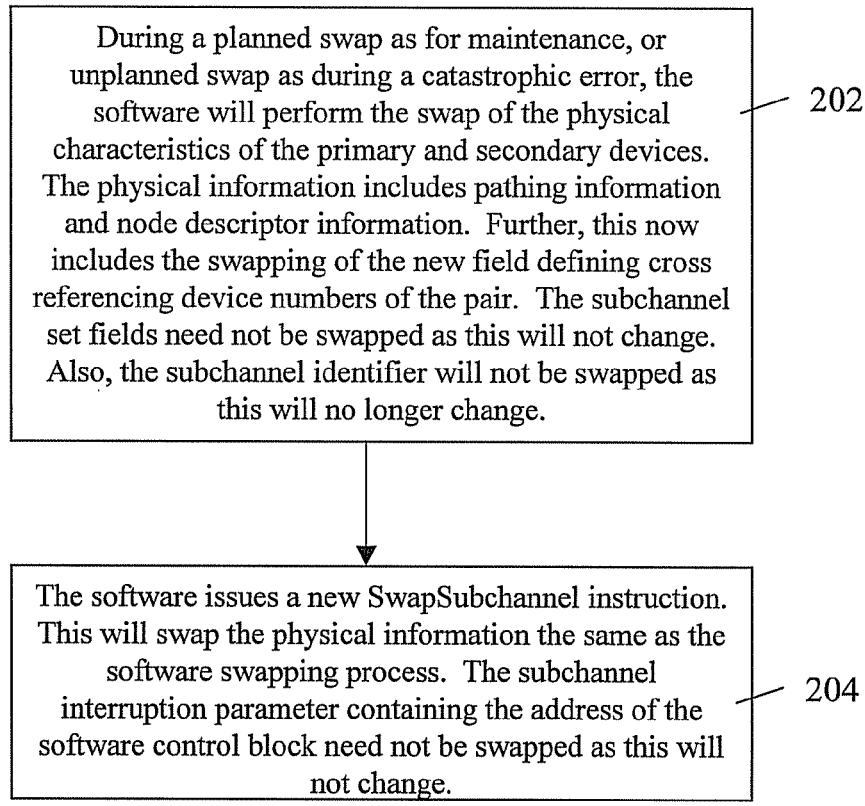
FIG. 2 is a flow diagram illustrating a method of swapping a PPRC secondary device definition residing in a subchannel set other than zero, with the primary subchannel residing in subchannel set zero, in the event of a control unit failure occurrence, in accordance with another embodiment of the invention.

Referring now to FIG. 2, there is shown a flow diagram illustrating a method of swapping a PPRC secondary device definition residing in a subchannel set other than zero, with the primary subchannel residing in subchannel set zero, in the event of a control unit failure occurrence, in accordance with another embodiment of the invention. The swapping process may occur during a planned or unplanned swap in which the software definitions swap the physical information such as pathing, device number, node descriptors as well as swapping the linkage information tying the pairs together. However, the subchannel number and subchannel set remain the same for both the primary and secondary devices. Subsequently, the new instruction SwapSubchannel is executed. The parameters for the instruction will include the "from" subchannel identifier and "from" subchannel set identifier and the "to" subchannel identifier and corresponding "to" subchannel set identifier. The SwapSubchannel instruction will swap the physical information in the subchannel definitions while maintaining the subchannel identifiers and subchannel set identifiers. The physical information that is swapped includes the pathing information as well as control unit information. As particularly shown in block 202, during a planned swap (as for maintenance, for example) or an unplanned swap (as during a catastrophic error, for example) the software will perform the swap of the physical characteristics of the primary and secondary devices. The physical information includes pathing information, device number, and node descriptor information. Further, this now includes the swapping of the new field defining cross-referencing device numbers of the pair. The subchannel set fields need not be swapped as this will not change. Also, the subchannel identifier will not be swapped as this will no longer change.

In block 204, the software issues a new SwapSubchannel instruction. This will swap the physical information in the same manner as the software swapping process of block 202 described above. The physical information includes pathing and control unit information, however, the subchannel interruption parameter containing the address of the operating system definition of the device need not be swapped as this will not change.

Figure 3:
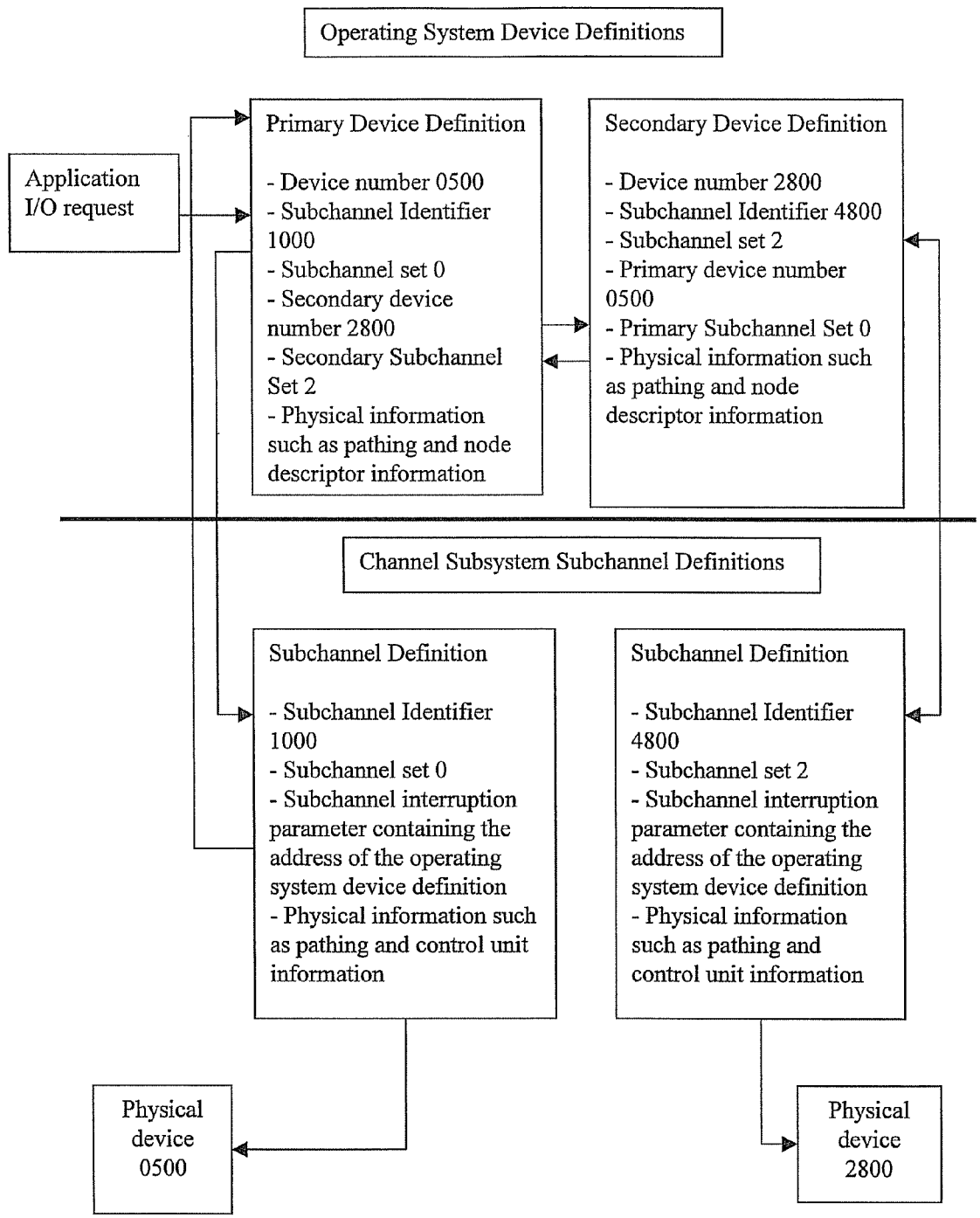
FIG. 3 is a schematic diagram illustrating exemplary software device definitions and the channel subsystem subchannel definitions and the linking therebetween, using the exemplary method of FIG. 1.

FIG. 3 is a schematic diagram illustrating exemplary software device definitions and the channel subsystem subchannel definitions and the linking therebetween, using the exemplary method of FIG. 1. In particular, FIG. 3 illustrates the software device definitions and the channel subsystem subchannel definitions, how the software PPRC device definitions are linked and how the software device definitions are linked to the channel subsystem subchannel definitions. It will be noted that the application I/O request will flow through the software device definition in subchannel set zero (0), through the channel subsystem subchannel definition, also in subchannel set 0, and finally to the physical device.

Figure 4:
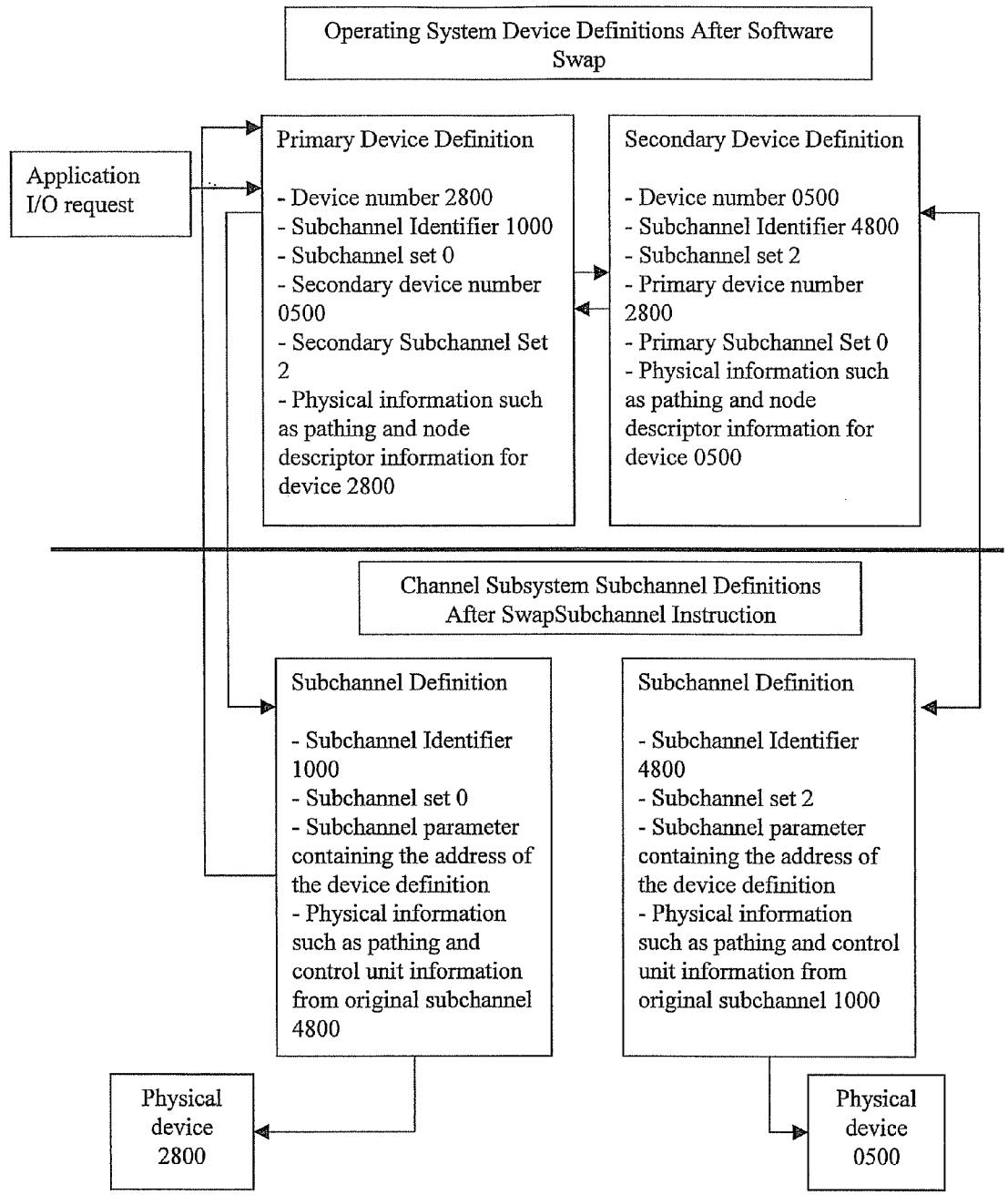
FIG. 4 is a schematic diagram illustrating the software device definitions and the channel subsystem subchannel definitions after the software swapping process and the execution of the new SwapSubchannel instruction, using the exemplary method of FIG. 2.

FIG. 4 is a schematic diagram illustrating the software device definitions and the channel subsystem subchannel definitions after the software swapping process and the execution of the new SwapSubchannel instruction, using the exemplary method of FIG. 2. In particular, FIG. 4 illustrates the software device definitions and the channel subsystem subchannel definitions after the software swapping process and the execution of the new SwapSubchannel instruction. It will be noted that the software PPRC device definitions continue to be linked and that the software device definitions continue to be linked to the same channel subsystem subchannel definitions. Further, the application I/O request continues to flow through the software device definition in subchannel set 0, through the channel subsystem subchannel definition, also in subchannel set 0, and finally to the physical device, now the secondary device.

Figure 5:
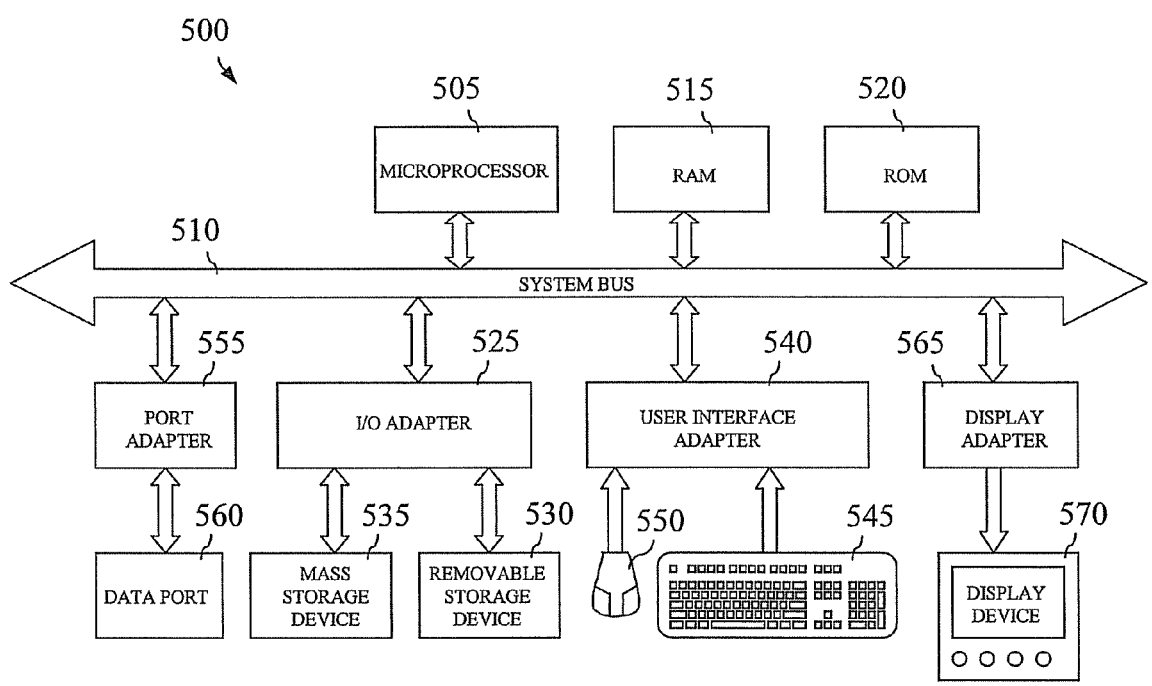
FIG. 5 is a schematic block diagram of a general-purpose computing system suitable for practicing embodiments of the present invention.

Generally, the method embodiments for swapping PPRC device definitions may be practiced with a general-purpose computer and the method may be coded as a set of instructions on removable or hard media for use by the general-purpose computer. FIG. 5 is a schematic block diagram of a general-purpose computing system suitable for practicing embodiments of the present invention. In FIG. 5, computing system 500 has at least one microprocessor or central processing unit (CPU) 505. CPU 505 is interconnected via a system bus 510 to a random access memory (RAM) 515, a read-only memory (ROM) 520, an input/output (I/O) adapter 525 for a connecting a removable data and/or program storage device 530 and a mass data and/or program storage device 535, a user interface adapter 540 for connecting a keyboard 545 and a mouse 550, a port adapter 555 for connecting a data port 560 and a display adapter 565 for connecting a display device 570.

ROM 520 contains the basic operating system for computing system 500. The operating system may alternatively reside in RAM 515 or elsewhere as is known in the art. Examples of removable data and/or program storage device 530 include magnetic media such as floppy drives and tape drives and optical media such as CD ROM drives. Examples of mass data and/or program storage device 535 include hard disk drives and non-volatile memory such as flash memory. In addition to keyboard 545 and mouse 550, other user input devices such as trackballs, writing tablets, pressure pads, microphones, light pens and position-sensing screen displays may be connected to user interface 540. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 530, fed through data port 560 or typed in using keyboard 545.

In view of the above, the present method embodiments may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to implement the exemplary method embodiments described above and illustrated in FIGS. 1-4.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for swapping a peer-to-peer remote copy (PPRC) secondary device definition from a subchannel set other than zero to subchannel set zero by a utilization of control block-field manipulation, the method comprising:

identifying a PPRC primary and secondary device pair, having a common operating system, wherein a PPRC primary device definition resides at subchannel set zero and the PPRC secondary device definition resides at a subchannel set other than subchannel set zero, and wherein a storage volume of the primary device is mirrored in a storage volume of the secondary device;

identifying at least one of a planned and unplanned exchange of physical information between the PPRC primary and secondary device pair;

within operating system definitions of the PPRC pair, exchanging a first type of physical information associated with the PPRC primary and secondary devices, including one or more of: pathing, node descriptor, device number, and a field cross referencing device numbers of the PPRC pair;

within channel subsystem definitions of the PPRC primary and secondary devices of a channel subsystem without the channel subsystem understanding a relationship between the PPRC primary and secondary device pair, via a SwapSubchannel instruction and in response to identifying the at least one of the planned and unplanned exchange of physical information between the PPRC primary and secondary device pair, exchanging a second type of physical information, including at least one of path unit information and control unit information, wherein issuing the SwapSubchannel instruction retains a subchannel identifier (ID), and a subchannel set identifier, but not a subchannel interruption parameter containing an address of the operating system definition of the device;

issuing, by the operating system, via an interface, a new SwapSubchannel instruction including at least one of the path unit information and control unit information, wherein issuing the new SwapSubchannel instruction retains a subchannel identifier, and the subchannel set identifier, but not the subchannel interruption parameter containing the address of the operating system definition of the device;

wherein the SwapSubchannel instructions instruct the PPRC primary and secondary device pair, to swap contents of two subchannels of the PPRC primary and secondary device pair while no other requests occur during the swap of contents, the two subchannels being the subchannel set zero and the subchannel set other than subchannel set zero, while maintaining the subchannel identifier and the subchannel set identifier, and direct the exchange the first and second types of physical information between the subchannel set zero associated with the PPRC primary device and the a subchannel set other than subchannel set zero associated with the PPRC secondary device, wherein application I/O accesses the PPRC secondary device definitions responsive to control unit failure occurrence in which the PPRC secondary device needs to become the PPRC primary device so that application I/O can proceed without interruption; and receiving and indicating that a new subchannel ID and pathing information for the PPRC primary and secondary device pair, needs to be updated within the operating system, wherein identifying a PPRC primary and secondary device pair in the operating system definition further comprises cross-referencing the PPRC primary and secondary devices by storing the secondary subchannel set identifier and device number in a control block field of the primary device number, and storing the primary subchannel set identifier and device number in a control block field of the secondary device number.

2. The method of claim 1, wherein the PPRC primary device in subchannel set zero is defined using any available device number in subchannel set zero.

3. The method of claim 2, wherein the PPRC secondary device in the subchannel set other than subchannel set zero is defined using any available device number therein, and wherein the PPRC secondary device is defined to be offline at operating system initialization.

4. The method of claim 3, further comprising obtaining, during operating system initialization, the subchannel identifier and the subchannel set identifier for each of the PPRC primary and secondary devices, and setting an address of a software control block in an associated subchannel interruption parameter.

5. A computer program product, comprising:

a non-transitory computer-readable medium having computer-executable program code stored thereon that, when executed, causes a computer to implement a method for swapping peer-to-peer remote copy (PPRC) secondary device definitions from a subchannel set other than zero to subchannel set zero by a utilization of control block-field manipulation, the method comprising:

identifying a PPRC primary and secondary device pair, having a common operating system, wherein a PPRC primary device definition resides at subchannel set zero and the PPRC secondary device definition resides at a subchannel set other than subchannel set zero, and wherein a storage volume of the primary device is mirrored in a storage volume of the secondary device;

identifying at least one of a planned and unplanned exchange of physical information between the PPRC primary and secondary device pair;

within operating system definitions of the PPRC pair, exchanging a first type of physical information associated with the PPRC primary and secondary devices, including one or more of: pathing, node descriptor, device number, and a field cross referencing device numbers of the PPRC pair;

within channel subsystem definitions of the PPRC primary and secondary devices of a channel subsystem without the channel subsystem understanding a relationship between the PPRC primary and secondary device pair, via a SwapSubchannel instruction and in response to identifying the at least one of the planned and unplanned exchange of physical information between the PPRC primary and secondary device pair, exchanging a second type of physical information, including at least one of path unit information and control unit information, wherein issuing the SwapSubchannel instruction retains a subchannel identifier (ID), and a subchannel set identifier, but not a subchannel interruption parameter containing an address of the operating system definition of the device;

issuing, by the operating system, via an interface, a new SwapSubchannel instruction including at least one of the path unit information and control unit information, wherein issuing the new SwapSubchannel instruction retains a subchannel identifier, and the subchannel set identifier, but not the subchannel interruption parameter containing the address of the operating system definition of the device;

wherein the SwapSubchannel instructions instruct the PPRC primary and secondary device pair, to swap contents of two subchannels of the PPRC primary and secondary device pair while no other requests occur during the swap of contents, the two subchannels being the subchannel set zero and the subchannel set other than subchannel set zero, while maintaining the subchannel identifier and the subchannel set identifier, and direct the exchange the first and second types of physical information between the subchannel set zero associated with the PPRC primary device and the a subchannel set other than subchannel set zero associated with the PPRC secondary device, wherein application I/O accesses the PPRC secondary device definitions responsive to control unit failure occurrence in which the PPRC secondary device needs to become the PPRC primary device so that application I/O can proceed without interruption; and receiving and indicating that a new subchannel ID and pathing information for the PPRC primary and secondary device pair, needs to be updated within the operating system, wherein identifying a PPRC primary and secondary device pair in the operating system definition further comprises cross-referencing the PPRC primary and secondary devices by storing the secondary subchannel set identifier and device number in a control block field of the primary device number, and storing the primary subchannel set identifier and device number in a control block field of the secondary device number.

6. The computer program product of claim 5, wherein the PPRC primary device in subchannel set zero is defined using any available device number in subchannel set zero.

7. The computer program product of claim 6, wherein the PPRC secondary device in the subchannel set other than subchannel set zero is defined using any available device number therein, and wherein the PPRC secondary device is defined to be offline at operating system initialization.

8. The computer program product of claim 7, wherein the method further comprises obtaining, during operating system initialization, the subchannel identifier and the subchannel set identifier for each of the PPRC primary and secondary devices, and setting an address of a software control block in an associated subchannel parameter.

9. A system for swapping peer-to-peer remote copy (PPRC) secondary device definitions from a subchannel set other than zero to subchannel set zero by the utilization of control block-field manipulation, comprising:

a computing network including a processing device in communication with one or more computer memory storage devices; and the computing network further configured to implement a method, the method further comprising:

identifying a PPRC primary and secondary device pair, having a common operating system, wherein a PPRC primary device definition resides at subchannel set zero and the PPRC secondary device definition resides at a subchannel set other than subchannel set zero, and wherein a storage volume of the primary device is mirrored in a storage volume of the secondary device;

identifying at least one of a planned and unplanned exchange of physical information between the PPRC primary and secondary device pair;

within operating system definitions of the PPRC pair, exchanging a first type of physical information associated with the PPRC primary and secondary devices, including one or more of: pathing, node descriptor, device number, and a field cross referencing device numbers of the PPRC pair;

within channel subsystem definitions of the PPRC primary and secondary devices of a channel subsystem without the channel subsystem understanding a relationship between the PPRC primary and secondary device pair, via a SwapSubchannel instruction and in response to identifying the at least one of the planned and unplanned exchange of physical information between the PPRC primary and secondary device pair, exchanging a second type of physical information, including at least one of path unit information and control unit information, wherein issuing the SwapSubchannel instruction retains a subchannel identifier (ID), and a subchannel set identifier, but not a subchannel interruption parameter containing an address of the operating system definition of the device;

issuing, by the operating system, via an interface, a new SwapSubchannel instruction including at least one of the path unit information and control unit information, wherein issuing the new SwapSubchannel instruction retains a subchannel identifier, and the subchannel set identifier, but not the subchannel interruption parameter containing the address of the operating system definition of the device;

wherein the SwapSubchannel instructions instruct the PPRC primary and secondary device pair, to swap contents of two subchannels of the PPRC primary and secondary device pair while no other requests occur during the swap of contents, the two subchannels being the subchannel set zero and the subchannel set other than subchannel set zero, while maintaining the subchannel identifier and the subchannel set identifier, and direct the exchange the first and second types of physical information between the subchannel set zero associated with the PPRC primary device and the a subchannel set other than subchannel set zero associated with the PPRC secondary device, wherein application I/O accesses the PPRC secondary device definitions responsive to control unit failure occurrence in which the PPRC secondary device needs to become the PPRC primary device so that application I/O can proceed without interruption; and receiving and indicating that a new subchannel ID and pathing information for the PPRC primary and secondary device pair, needs to be updated within the operating system, wherein identifying a PPRC primary and secondary device pair in the operating system definition further comprises cross-referencing the PPRC primary and secondary devices by storing the secondary subchannel set identifier and device number in a control block field of the primary device number, and storing the primary subchannel set identifier and device number in a control block field of the secondary device number.

10. The system of claim 9, wherein the PPRC primary device in subchannel set zero is defined using any available device number in subchannel set zero.

11. The system of claim 10, wherein the PPRC secondary device in the subchannel set other than subchannel set zero is defined using any available device number therein, and wherein the PPRC secondary device is defined to be offline at operating system initialization.

12. The system of claim 11, wherein the method further comprises obtaining, during operating system initialization, the subchannel identifier and the subchannel set identifier for each of the PPRC primary and secondary devices, and setting an address of a software control block in an associated subchannel parameter.

\* \* \* \* \*